Patented Apr. 25, 1950

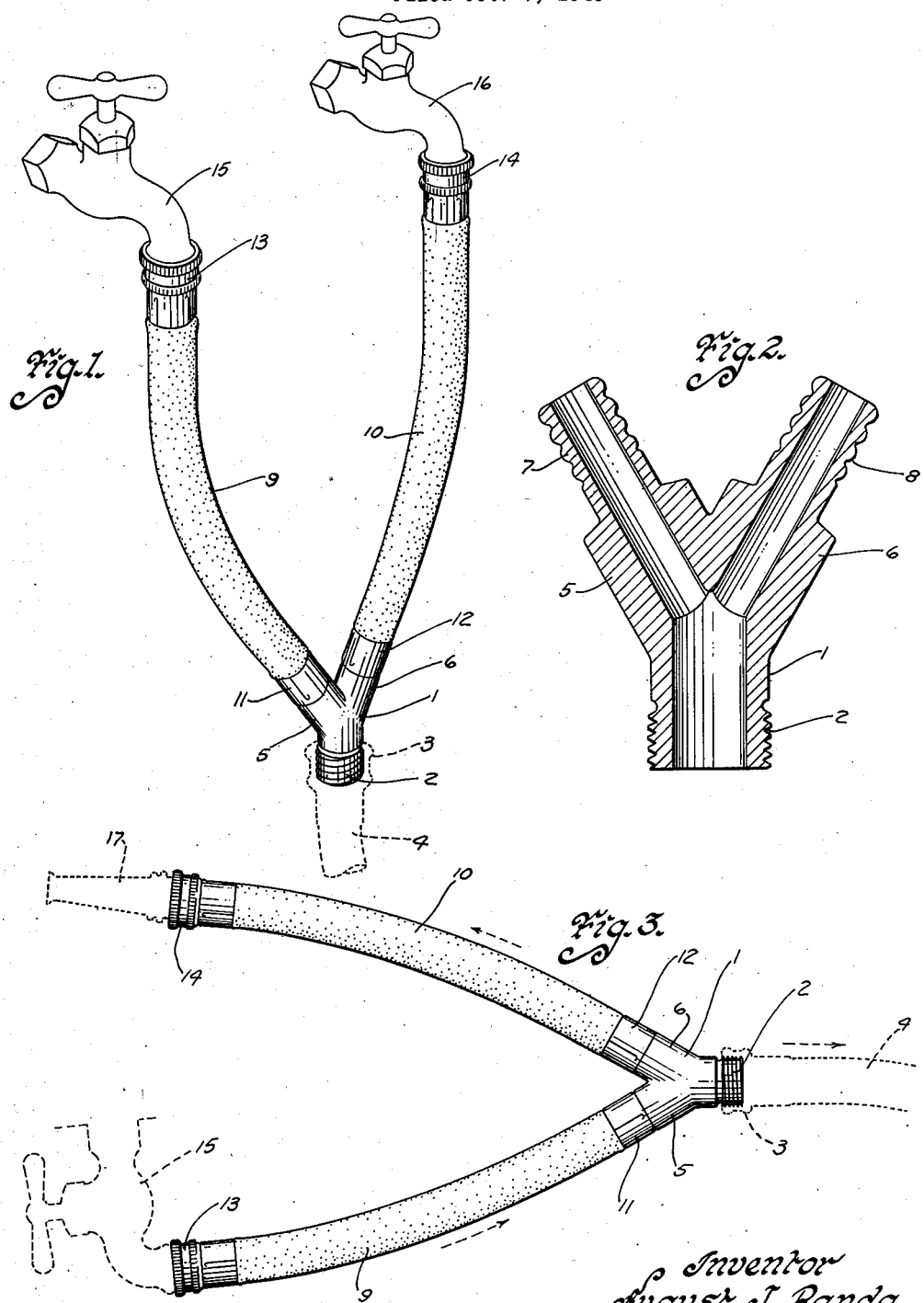

2,505,303

UNITED STATES PATENT OFFICE 2,505,303

Y-FITTING

August J. Randa, Des Moines, Iowa

Application October 7, 1948, Serial No. 53,178

1 Claim. (Cl. 285—18)

This invention relates to a Y-fitting and more particularly to a Y-fitting incorporated in a mixing device to mix two streams of water into one.

At present the basements of most homes are equipped with hot and cold water faucets in order that laundering may be done in the basement. If the tubs to receive the water are removed from the wall through which the faucets extend, a hose must be attached to the faucets to conduct the water to the tubs. If a mixing of hot and cold water can be effected it is desirable to enter the water into the tubs at the proper temperature.

It is an object of the invention, among others to provide a Y-fitting that rubber hoses may be attached directly to male ends on branches of the Y-fitting and a fitting attached to the single conduit end of the Y-fitting.

It is another object of the invention to provide a mixing device wherein a Y-fitting has a single conduit end to receive a fitting attached to a hose to conduct water away from the fitting and hoses attached to branches extending from the single conduit end, said branches presenting male ends to receive the hoses and fittings on the other ends of the hoses attached to the branches.

It is a still further object of the invention to provide a Y-fitting in a mixing device that is simple in construction and operation and economical both in construction and operation; a structure that is long lasting; a Y-fitting and mixing device that is easy to assemble and simple in design; a Y-fitting and mixing device requiring no special skill on the part of a housewife to assemble on faucets; and a Y-fitting and mixing device that can be supplied at an economical price.

With the foregoing and other objects in view, the invention will be more fully described herewith and will be particularly pointed out in the claim appended hereto.

In the drawings wherein like symbols refer to like or corresponding parts throughout the several views:

Figure 1 is an elevational view of the mixing device including the Y-fitting attached to faucets.

Figure 2 is a sectional view through the Y-fitting.

Figure 3 shows the mixing device used to connect two flow lines from one source of supply.

Referring first to Figure 2, a Y-fitting is shown having a single conduit 1 which is externally screw threaded at 2 to receive a thimble fitting 3 attached to one end of a hose 4. The fitting has two branches 5 and 6 extending from the single conduit 1 presenting male ends 7 and 8 to which hoses 9 and 10 may be attached by metal bands 11 and 12 crimped over the hose ends. The hoses 9 and 10 have thimble couplings 13 and 14 on the other ends which thimble couplings may attach to faucets 15 and 16 as suggested in Figure 1. The faucet 15 may deliver hot water while the faucet 16 may deliver cold water.

When the male ends 7 and 8 on the branches 5 and 6 of the Y-fitting are connected to hoses 9 and 10 and the hoses 9 and 10 are in turn coupled to faucets 15 and 16, the structure serves as a mixing device for hot and cold water. The fittings 13 and 14 are screwed on to the faucets 15 and 16 in the well known manner and the faucets then opened. The hose 9 delivers hot water to branch 5 and hose 10 delivers cold water to branch 6. The streams of hot and cold water are united into one stream in the conduit 1. The hose 4 may be of any length desired and delivers the water to a tub or tubs spaced from the faucets.

In Figure 3 another hook-up of the Y-fitting in a distribution system is shown. The branch 5 with hose 9 connected thereto is connected to a faucet 15. Water is delivered to the Y-fitting and is distributed to hose 10 and hose 4, both of which have nozzles on the end thereof. In this set-up two hose lines are available as for watering a vegetable and a lawn at the same time.

It will be understood that the invention has been described for purposes of illustration and explanation and that changes and variations are possible without departing from the scope of the invention; all such modifications and changes are intended to be included in the appended claim.

I claim:

A Y-fitting comprising a main conduit having a threaded male hose fitting formed on one end, and two branch conduits jointly communicating with the other end of said main conduit; said main conduit having a fluid flow capacity approximately equal to the sum of the fluid flow capacities of said branch conduits; said branch conduits each, at its free end, being formed into a male hose fitting that has external alternate smooth ridges and grooves parallel to each other and in planes perpendicular to the longitudinal axis of the bore of each branch conduit.

AUGUST J. RANDA.

REFERENCES CITED

The following references are of record in the file of this patent:

UNITED STATES PATENTS

| Number | Name | Date |
|---|---|---|
| 724,129 | Schrader | Mar. 31, 1903 |
| 947,461 | Skiff | Jan. 25, 1910 |
| 1,146,662 | Staab | July 13, 1915 |